(12) United States Patent
Karlsson et al.

(10) Patent No.: US 9,401,640 B2
(45) Date of Patent: Jul. 26, 2016

(54) VOLTAGE DROOP CONTROL IN A VOLTAGE-REGULATED SWITCHED MODE POWER SUPPLY

(71) Applicant: Telefonaktiebolaget L M Ericsson (publ), Stockholm (SE)

(72) Inventors: Magnus Karlsson, Oskarshamn (SE); Oscar Persson, Kalmar (SE); Andreas Svensson, Tibro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 234 days.

(21) Appl. No.: 14/347,322

(22) PCT Filed: Apr. 11, 2013

(86) PCT No.: PCT/EP2013/057570
§ 371 (c)(1),
(2) Date: Mar. 26, 2014

(87) PCT Pub. No.: WO2014/166537
PCT Pub. Date: Oct. 16, 2014

(65) Prior Publication Data
US 2015/0222183 A1    Aug. 6, 2015

(51) Int. Cl.
*G05F 1/00* (2006.01)
*H02M 3/158* (2006.01)
(Continued)

(52) U.S. Cl.
CPC .............. *H02M 3/158* (2013.01); *H02M 3/156* (2013.01); *H02M 7/493* (2013.01); *H02M 3/1584* (2013.01); *H02M 3/285* (2013.01);
(Continued)

(58) Field of Classification Search
CPC ................... H02M 3/156; H02M 2001/0025; H02M 3/158; H02M 2007/4822; H02M 3/285
USPC ........................................................ 323/271
See application file for complete search history.

(56) References Cited

U.S. PATENT DOCUMENTS 7,064,528 B2    6/2006    Jochum et al.
7,928,704 B2    4/2011    Huang
(Continued)

OTHER PUBLICATIONS

PCT Notification of Transmittal of the International Search Report and the Written Opinion of the International Searching Authority for PCT Counterpart Application No. PCT/EP2013/057570, (Jan. 8, 2014), 9 pages.
(Continued)

*Primary Examiner* — Adolf Berhane
*Assistant Examiner* — Afework Demisse
(74) *Attorney, Agent, or Firm* — NDWE LLP

(57) ABSTRACT

A switched mode power supply (SMPS) comprising a controller configured to control switching of the SMPS to regulate an output voltage at an output of the SMPS based on a feedback signal that indicates the output voltage, and a voltage droop control circuit. The voltage droop control circuit comprises a voltage droop control signal generator that detects a voltage drop across a component of the SMPS that is indicative of a current flowing through the output of the SMPS during operation. The voltage droop control signal generator is an active device arranged to generate, based on the detected voltage drop, an output voltage droop control signal for causing the controller to adjust the regulation of the output voltage. The voltage droop control circuit further comprises a reference voltage generator arranged to bias at least one of the first and second inputs of the voltage droop control signal generator.

13 Claims, 8 Drawing Sheets

(51) Int. Cl.
*H02M 7/493* (2007.01)
*H02M 3/156* (2006.01)
H02M 3/28 (2006.01)
H02M 7/48 (2007.01)
H02M 1/00 (2006.01)

(52) U.S. Cl.
CPC .............. *H02M2001/0025* (2013.01); *H02M 2007/4822* (2013.01)

(56) References Cited

U.S. PATENT DOCUMENTS

| 2002/0125871 | A1* | 9/2002 | Groom | H02M 3/156 323/284 |
| 2006/0043943 | A1* | 3/2006 | Huang | H02M 3/1584 323/222 |
| 2013/0057237 | A1* | 3/2013 | Chen et al. | 323/271 |

OTHER PUBLICATIONS

"A Simple Current-Sense Technique Eliminating a Sense Resistor", *Linfinity Application Note AN-7, Rev. 1.1*, (Jul. 1998), 6 pages.

Dallago, et al., "Lossless Current Sensing in Low-Voltage High-Current DC/DC Modular Supplies", *IEEE Transactions on Industrial Electronics*, vol. 47, No. 6, (Dec. 2000), pp. 1249-1252.

International Preliminary Report on Patentability, Application No. PCT/EP2013/057570, dated Oct. 22, 2015, 7 pages.

* cited by examiner

VOLTAGE DROOP CONTROL IN A VOLTAGE-REGULATED SWITCHED MODE POWER SUPPLY

CROSS-REFERENCE TO RELATED APPLICATIONS

This application is a National stage of International Application No. PCT/EP2013/057570, filed Apr. 11, 2013, which is hereby incorporated by reference.

TECHNICAL FIELD

The present invention generally relates to the field of switched mode power supplies (sometimes referred to as switch mode power supplies or switching mode power supplies) and more specifically to the control of voltage droop in an output voltage-regulated switched mode power supply.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted using a feedback signal to convert an input voltage to a desired output voltage. A SMPS may take the form of a rectifier (AC/DC converter), a DC/DC converter, a frequency changer (AC/AC) or an inverter (DC/AC).

If the power output capability of a single SMPS is not sufficient for a given application, it may be possible to connect multiple SMPSs in parallel to supply power to a load via a common output rail. SMPSs that are not output voltage-regulated (especially diode-rectified DC/DC converters) are well-suited to load current sharing arrangements of this kind, since the parasitic resistance in the power train of each SMPS usually causes the converter's output voltage to decrease as the converter's output current increases, i.e. a natural output voltage droop is present. The droop exhibited by each SMPS facilitates current sharing with other SMPSs in the system by effectively regulating the output voltage of the SMPS so as to counter any imbalance between the SMPS's output current and the output currents of the other SMPSs in the system. Thus, the voltage droop characteristic allows the paralleled SMPSs to share the task of supplying current to their load evenly. Load sharing in such a system of paralleled SMPSs may be improved by increasing the amount of voltage droop exhibited by each SMPS, and taking care to set the initial setting of each SMPS (i.e. output voltage at zero load current) appropriately.

However, there are many SMPS applications in which the SMPS output voltage to be supplied to load circuitry (e.g. a CPU) must be regulated so as to remain within a (usually very narrow) voltage band. Output voltage regulation may be achieved, for example, by feeding a signal indicative of the SMPS output voltage back to a pulse width modulation (PWM) controller of the SMPS, which monitors the feedback signal and adjusts the switching duty cycle of the SMPS's switching element(s) so as to maintain the output voltage at a predetermined value, regardless of the load current level. Alternatively, a switching frequency controller may be used instead of a PWM controller, to control the switching frequency of the SMPS's switching element(s) so as to maintain the output voltage at a predetermined value, regardless of the load current level. Owing to their wide availability, it is also often desirable to run voltage-regulated SMPSs in parallel to feed load circuits having high power demands. However, the absence of a natural output voltage droop makes it difficult to maintain even current sharing among the SMPSs in such parallel systems, and it therefore becomes necessary to introduce some form of artificial voltage droop in the SMPSs. A simplified example of how a regulated SMPS may be provided with artificial droop will now be explained with reference to FIG. 1.

FIG. 1 is a schematic of a conventional SMPS 100, which comprises a switch network 110 having one or more active switching devices (e.g. MOSFETs) that are controlled to switch between conducting ("ON") and non-conducting ("OFF") states with a switching duty cycle set by a PWM controller 120. The PWM controller 120 determines the duty cycle based on a feedback signal indicative of the SMPS output voltage, $V_{out}$, so that the output voltage $V_{out}$ is maintained at a substantially constant value for any given SMPS current load. The PWM controller 120 is controlled to provide a voltage droop by a voltage droop control circuit 130. More specifically, the voltage droop control circuit 130 generates, based on a signal indicative of the SMPS output current that is generated by a current sensing circuit 140, a droop control signal 150 for adjusting an output voltage set-point (i.e. an output voltage target value) that is used by the PWM controller 120 to regulate $V_{out}$.

The current sensing circuit 140 may simply be configured to measure the voltage drop across a dedicated shunt resistor connected to the output of the SMPS 100, such that the voltage droop control circuit 130 receives said voltage drop as the signal indicative of the SMPS output current, $I_{out}$. However, the use of a current shunt to measure $I_{out}$ has the drawbacks of degrading the thermal coupling of the power train 110 to the output pin(s) of the SMPS 100, and decreasing SMPS efficiency through resistive losses.

In switched mode power supplies where an output choke is present (e.g. in Forward-topology DC/DC converters, among others), these problems may be avoided by making a "lossless" current measurement as described, for example, in "A Simple Current-Sense Technique Eliminating a Sense Resistor" (Linfinity Application Note AN-7, Rev. 1.1 07/1998). In these cases, the current sensing circuit 140 and the voltage droop control circuit 130 may be configured as shown schematically in FIG. 2, while the PWM controller 120 may be provided in the form shown schematically in FIG. 3.

In the example of FIG. 2, the current sensing circuit 140 comprises a series combination of a resistor $R_0$ and capacitor C, which is connected to the upper output rail of the SMPS 100, in parallel with the output choke having an inductance L and parasitic resistance $R_L$. The voltage droop control circuit 130 comprises an operational amplifier ("op-amp") 131 whose inverting (−) and non-inverting (+) inputs are connected across capacitor C via resistors $R_1$ and $R_2$, respectively. Being an active device, the op-amp 131 needs to receive power from a voltage source (not shown) in order to be able to generate a signal $V_A$, which is based on the signals received at the inverting (−) and non-inverting (+) inputs. The signal $V_A$ is output to the PWM controller 120 shown in FIG. 3, and is also fed back to the inverting input via resistor $R_3$. In FIG. 2, the signal indicative of the output current is superimposed with a large square wave from the switch network 110, as well as high-frequency noise and short spikes caused by the switching. These high-frequency components of the signal are filtered out by the first order low-pass filter that is provided by $R_0$ and C. It is noted that the reference (+) terminal of the differential amplifier is at the output voltage $V_{out}$, meaning that the aforementioned voltage source is required to provide a supply voltage higher than $V_{out}$ for the op-amp 131. As will be explained in the following, the PWM controller 120 is referenced to ground in this example, so that a DC-level shift of the signal $V_A$ is required in order to allow the voltage droop control circuit 130 and the PWM controller 120 to work together.

FIG. 3 shows details of the PWM controller 120, which may, as in the present example, comprise an output voltage regulator in the exemplary form of a PID regulator 121 optionally having a so-called "Lucent trim". The PWM controller 120 also includes a switch drive circuit 122 that generates, based on the output of the PID regulator 121, drive signals for the switch(es) in the switch network 110 that is/are under its control. The signals $V_{out}$ and $V_A$ input to the PWM controller 120 are referenced to a stable voltage reference, $V_{ref}$, which is typically 1.25 V. The signal $V_A$ is fed to the inverting input of the op-amp 123 that forms part of the PID regulator 121. In FIG. 3, $V_{aux}$ is an optional auxiliary "housekeeping" power supply for powering the internal electronics of the SMPS, and in this example acts to provide a bias current to the voltage reference diode during start-up when the $V_{out}$ is not present. $V_{aux}$ can also be smaller than the output voltage $V_{out}$.

SUMMARY

The present inventors have studied the operation of power supply systems having regulated SMPSs with artificial droop as described above that are connected in parallel to feed a load via a common output rail, and have identified a heretofore unrecognised problem that occurs in systems of this kind; namely, that the system has an instability that can significantly degrade its efficiency and reliability. More specifically, the inventors have found that the power supply system can enter a mode of operation in which one or more of the SMPSs sink (i.e. receive via their output terminal) current that is supplied by the other SMPSs to the output rail and, moreover, may be slow or unable to recover from this state. This problem is particularly pronounced in, but not limited to, synchronous rectified converters.

The present inventors have further discovered that the root cause of this problem (and of potential problems in the idle state, when the output current is zero) is the inability of the known voltage droop control circuits to respond appropriately to a current flowing into the SMPS through the output terminal(s) (i.e. to a negative output current). For example, although the conventional voltage droop control circuit shown in FIG. 2 causes the output voltage of the SMPS to decrease substantially linearly as the current flowing out of the SMPS increases, the output voltage tends towards saturation at a maximum value when the current flowing into the SMPS increases, as shown in FIG. 7.

The inventors have realised that the reliability of the SMPSs in the system can be significantly improved by configuring the voltage droop control circuit in one or more (and preferably all) of the SMPSs in the system such that the droop characteristic (increasing $V_{out}$ with decreasing $I_{out}$) observed for positive values of $I_{out}$ continues to be observed even when $I_{out}$ reaches zero and then becomes negative, for example as shown in FIG. 6. This improved response for $I_{out}<0$ allows an SMPS sinking current from the output rail to increase its output voltage enough to effectively reduce the current flowing into the SMPS through its output terminal(s), or to cause the current flow to reverse so that the SMPS stops drawing current from the output rail. With this insight, the inventors have conceived a voltage droop control circuit exhibiting such an improved response, which advantageously requires a power supply voltage no larger than $V_{out}$ for its operation, and which may be realised without increasing the component count in the circuit of FIGS. 2 and 3.

More specifically, there is described herein an SMPS comprising a controller configured to control switching of the SMPS to regulate an output voltage at an output of the SMPS based on a feedback signal that is indicative of the output voltage, and a voltage droop control circuit. The voltage droop control circuit comprises a voltage droop control signal generator having a first input and a second input connected so as to detect a voltage drop across a component of the SMPS that is indicative of a current flowing through the output of the SMPS during operation. The voltage droop control signal generator is an active device that is arranged to generate, based on the detected voltage drop, an output voltage droop control signal for causing the controller to adjust the regulation of the output voltage. The voltage droop control circuit further comprises a reference voltage generator arranged to bias at least one of the first and second inputs of the voltage droop control signal generator.

By providing a reference voltage generator that biases an input of the voltage droop control circuit, it becomes possible to prevent the sign of the difference between the voltage at the first input and the voltage at the second input of the voltage droop control signal generator from changing when a reversal of the output current flow direction occurs (i.e. when $I_{out}$ changes sign), so that the voltage droop control signal generator is able to exhibit a desired (e.g. substantially linear) voltage droop characteristic not only for $I_{out}>0$, but also over a larger range of negative values of $I_{out}$ than the background example of FIG. 2. In other words, in an embodiment, the reference voltage generator effectively extends the range of output current values over which the voltage droop control signal generator can operate before the size of the voltage droop control signal becomes limited by the supply voltage required to power the voltage droop control signal generator.

Thus, in an embodiment, the voltage droop control signal generator may generate an output voltage droop control signal that causes the controller to adjust the regulation of the output voltage such that: the output voltage increases when current flowing out of the SMPS through the output thereof decreases; and the output voltage increases when current flowing into the SMPS through the output thereof increases, the amount of increase in the output voltage in the latter case being dependent upon the reference voltage generated by the reference voltage generator.

There is also provided a power supply system comprising a plurality of switched mode power supplies that are connected in parallel so as to be capable of supplying power to a common load, wherein at least one of the switched mode power supplies is as set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Figure 4:
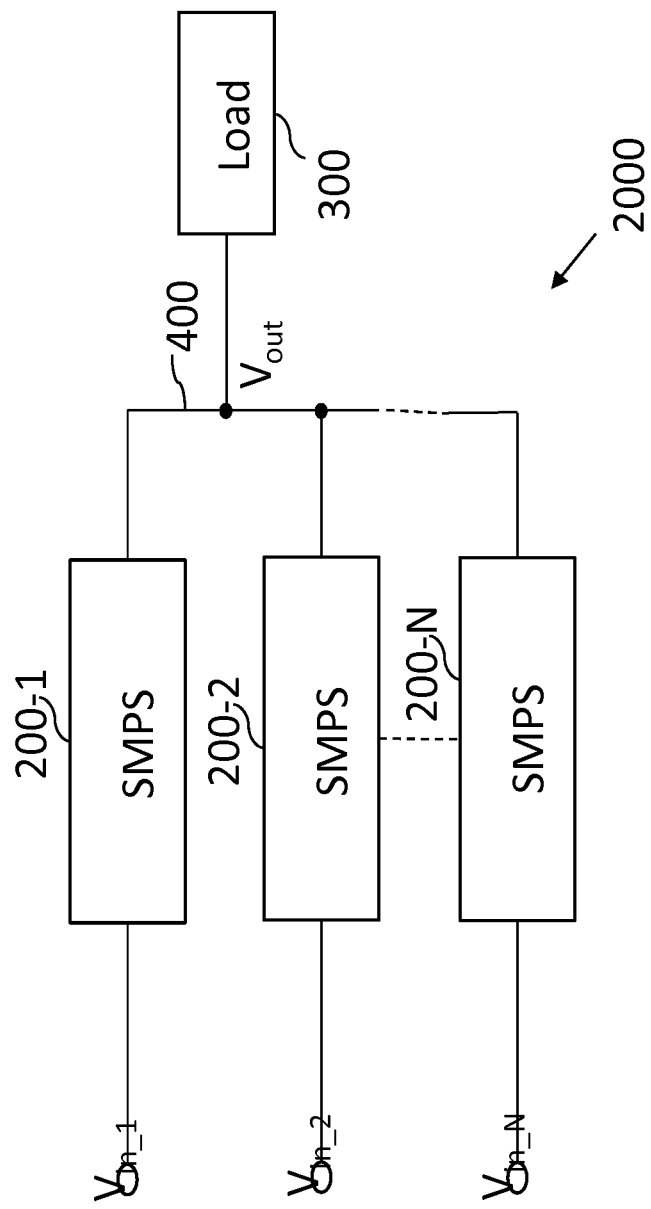
FIG. 4 shows a power supply system according to an embodiment of the present invention, which comprises a plurality of SMPSs.

FIG. 4 shows a power supply system 2000 comprising a plurality of voltage-regulated SMPSs 200-1 to 200-N, each having control circuitry for providing an output voltage droop (that is, an increase in the SMPS output voltage with decreasing values of the SMPS output current) that is substantially linear for both positive and negative values of the output current. An example of control circuitry that can provide this functionality will be described in the following with reference to FIG. 5.

In the power supply system 2000 of FIG. 4, the SMPSs 200-1 to 200-N are connected in parallel to supply power to a common load 300 via a common output rail 400. Although the SMPSs 200-1 to 200-N are arranged to convert respective input voltages $V_{in\_1}$ to $V_{in\_N}$ to respective output voltages near $V_{out}$, one or more of the SMPSs 200-1 to 200-N may alternatively be supplied with power from a common source at their inputs. The SMPSs 200-1 to 200-N all have the same configuration, which will now be described with reference to FIG. 5.

Figure 5:
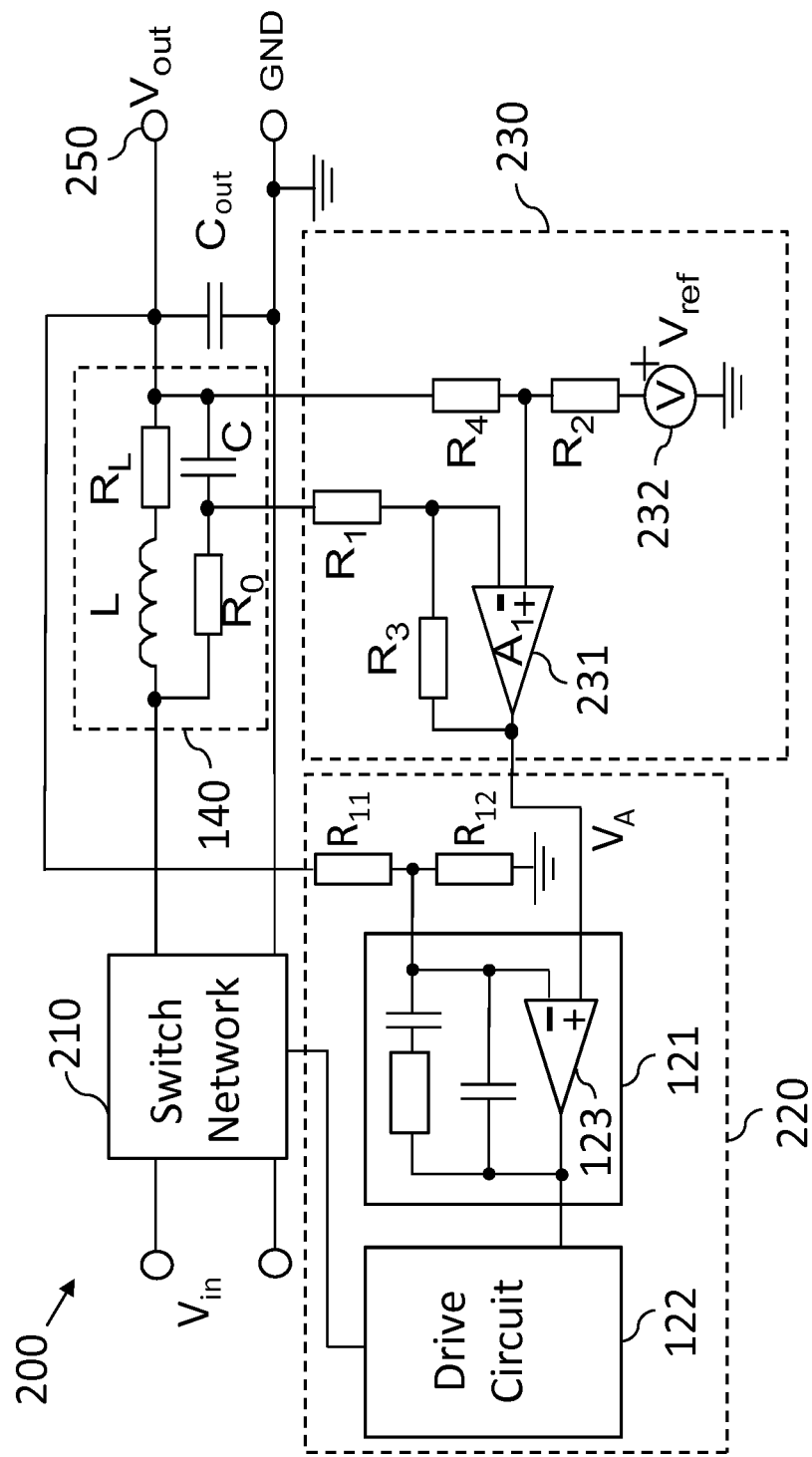
FIG. 5 shows an SMPS in FIG. 5 according to an embodiment of the present invention.

FIG. 5 shows an SMPS 200 according to an embodiment of the present invention. The SMPS 200 of the present embodiment comprises a switch network 210 having one or more active switching devices (e.g. transistors such as MOSFETs) that are connected and controlled to switch such that the SMPS 200 converts the input voltage to an output voltage. The switch network 100 may, for example comprise a buck converter having a single active switching device and a diode, or employ a more complex arrangement. For example, if the SMPS 200 includes an isolation transformer, the switch network may comprise a half-bridge arrangement of two switching devices, a push-pull arrangement or, in higher-power applications, a full-bridge arrangement of four switching devices on the primary side of the transformer. Those skilled in the art will appreciate that the SMPS switch network may be configured in other ways, depending on various operational requirements.

The controller 220 of the SMPS 200 is configured to control switching of the SMPS 200 to regulate the output voltage $V_{out}$ based on a feedback signal that is indicative of $V_{out}$. The feedback signal may, as in the present embodiment, be a portion of the output voltage $V_{out}$ (the fraction being determined e.g. by the values of resistors of a potential divider, as in the example of FIG. 5). In the present embodiment, the controller 220 takes the exemplary form of a PWM controller having a PID regulator 121 and a switch drive circuit 122 that are the same as in the example of FIG. 3. The description of these components will therefore not be repeated. However, the controller 220 differs from the PWM controller 120 shown in FIG. 3 in that the operational amplifier 123 is arranged to receive the feedback signal $V_{out}$ and the output voltage droop control signal $V_A$ at different inputs thereof. The controller 220 uses the received signals to control switching of the switch network 210, via the drive circuit 122, so that the output voltage $V_{out}$ is maintained at a substantially constant value for a given SMPS output current.

The SMPS 200 also includes a voltage droop control circuit 230 that is configured to generate, based on a signal indicative of a current flowing through the output 250 of the SMPS 200 during operation, an output voltage droop control signal to cause the controller 220 to adjust the regulation of the output voltage such that the output voltage increases when current flowing out of the SMPS 200 through the output 250 decreases, and such that the output voltage increases when current flowing into the SMPS 200 through the output 250 increases, the amount of increase in the output voltage being dependent upon the reference voltage level. For example, in the present embodiment, the rate at which the output voltage increases with increasing negative output current becomes larger as the reference voltage decreases, for at least some values of $I_{out}<0$.

In the present embodiment, the voltage droop control circuit 230 comprises a voltage droop control signal generator, which is arranged to generate a voltage droop control signal for causing the controller 220 to adjust regulation of the output voltage $V_{out}$. As the voltage droop control signal generator is an active device, the amplitude of the voltage droop control signal is limited by the voltage of a voltage source (not shown) used to power the voltage droop control signal generator. In the present embodiment, the voltage droop control signal generator is provided in the exemplary form of an op-amp 231, whose input terminals are connected so as to detect a voltage drop across a component of the SMPS 200 that is indicative of the output current. This component may, for example, take the form of a resistor that is connected in the output current path to output terminal 250.

Alternatively, in some SMPS topologies where an output choke (inductor) is used, it may be advantageous to arrange the op-amp 231 to measure the voltage drop across the output choke. Besides avoiding the need to provide a resistor in the output current path (which, as noted above, degrades the efficiency of the SMPS and the thermal coupling of the switch network 210 to the output terminal 250), use of the inductor for current measurement provides the additional advantage of introducing a degree of thermal stabilisation into the voltage droop control. More specifically, since the parasitic resistance of the inductor typically increases as the temperature of the inductor coil increases, the amount of output voltage droop also increases with increasing temperature, thereby reducing the current output by the power train of the SMPS. Thus, if an SMPS in the power supply system 2000 runs hot then, due to the resistive loss in the choke becoming greater at higher load, the SMPS will automatically regulate its output voltage such that it receives a lighter load. The initial set output voltage at zero load will not be affected but the amount of droop provided at higher loads will increase.

In SMPSs having multiple power output pins, it may not be possible to find a copper trace that can be used as a current shunt. In this case, it may be advantageous to use the choke to measure the output current, particularly as adding a dedicated component for the current measurement may be undesirable owing to efficiency and space requirements.

In the present embodiment, the op-amp 231 is connected so as to measure a portion (less than all) of the voltage drop across the output choke (represented in FIG. 5 by its inductance L and parasitic resistance $R_L$). More specifically, the op-amp 231 is connected to the current sensing circuit 140 (which is the same as that in FIG. 2), such that the inverting (−) and non-inverting (+) inputs of the op-amp 231 are connected across capacitor C via resistors $R_1$ and $R_4$, respectively. Thus, in the present embodiment, the voltage drop across capacitor C provides an indication of SMPS output current. In operation, the op-amp 231 generates a signal $V_A$ that is output to the controller 220, and that is also fed back to the inverting input of the op-amp 231 via resistor $R_3$. The op-amp 231 generates a signal $V_A$ that is output to the controller 220, and that is also fed back to the inverting input via resistor $R_3$.

The voltage droop control circuit 230 further comprises a reference voltage generator 232 arranged to bias e.g. the non-inverting input (+) of the op-amp 231 with a positive reference voltage, $V_{ref}$. The reference voltage generator 232 may, as in the present embodiment, be provided in the form of a stable DC voltage source (e.g. a battery) and optionally a means for converting the source voltage to the required level (e.g. a potential divider). If a reference voltage source with non-zero impedance is used as the reference voltage generator 232, it may be advantageous to insert a buffer between resistor $R_2$ and the voltage source in order to improve performance, particularly during start-up of the SMPS 200.

Figure 1:
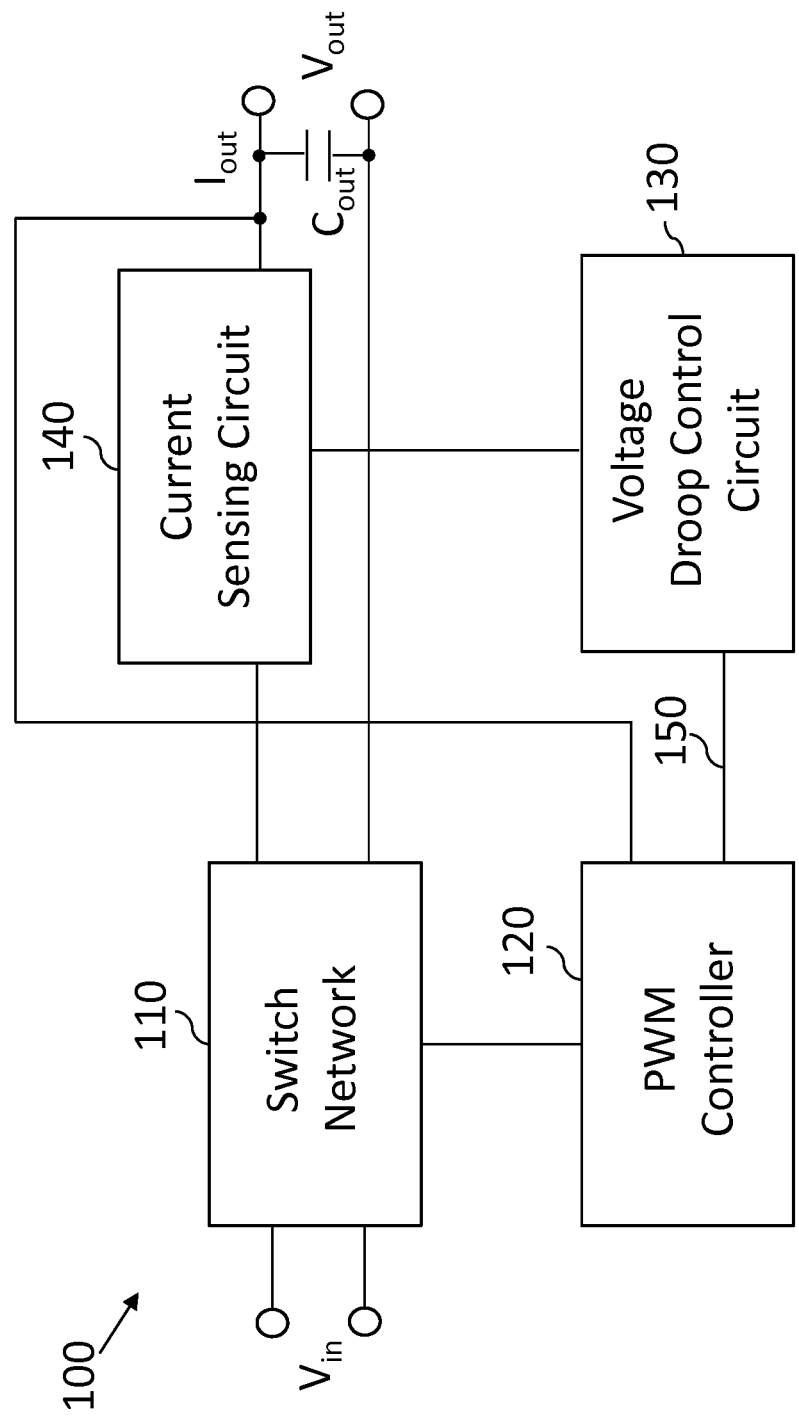
FIG. 1 is a schematic of a conventional regulated SMPS with artificial droop.
Figure 2:
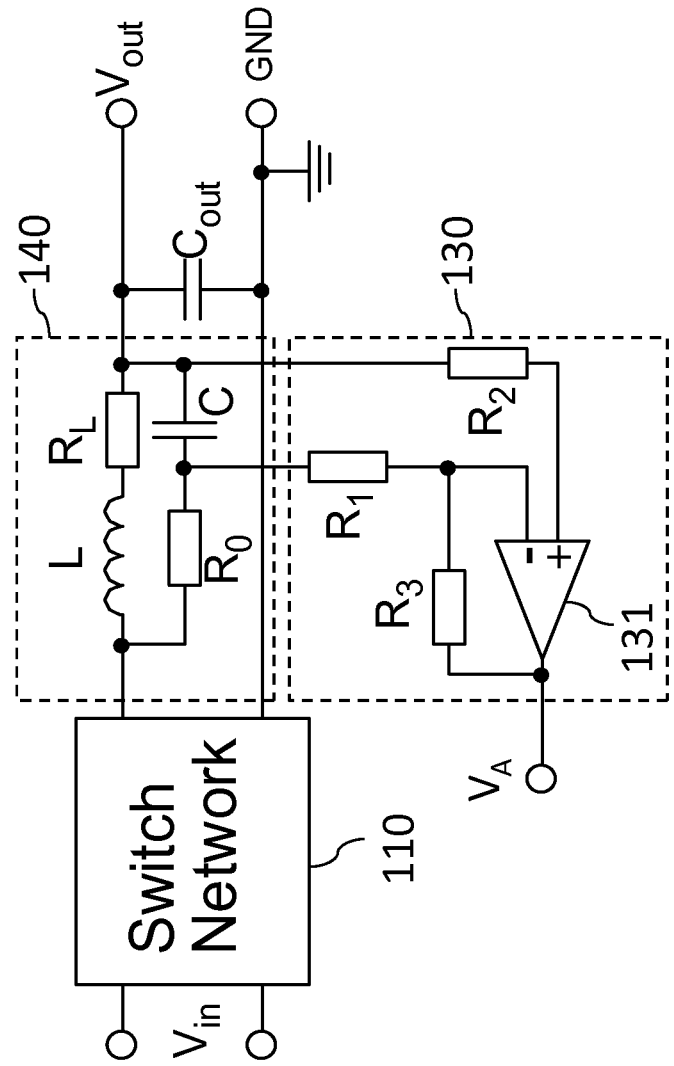
FIG. 2 shows details of the current sensing circuit 140 and voltage droop control circuit 130 of the SMPS shown in FIG. 1.
Figure 3:
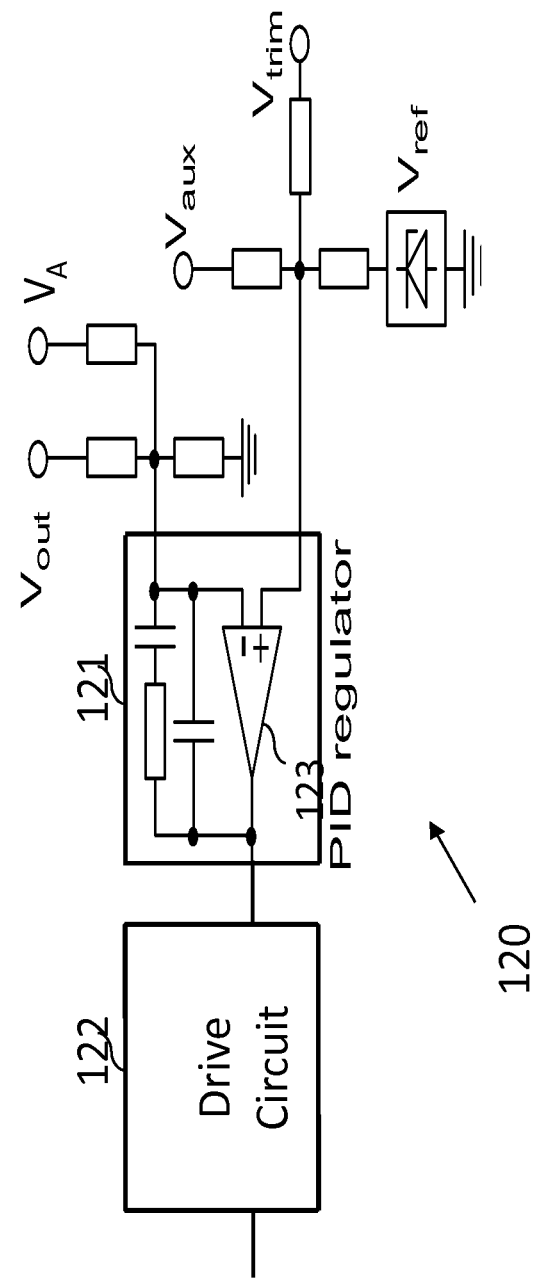
FIG. 3 shows details of the PWM controller 120 of the SMPS shown in FIG. 1.

Offsetting the reference level of the op-amp 231 in relation to the output rail at $V_{out}$ to any extent, by means of the reference voltage generator 232, allows the op-amp 231 to be powered using a voltage lower than $V_{out}$ (which can by supplied by the SMPS 200 itself), whilst allowing the op-amp 231 to generate a control signal that causes the controller 220 to adjust the regulation of the output voltage $V_{out}$ so as to provide a greater amount of voltage droop, for at least some negative output current values, than the conventional circuit of FIGS. 2 and 3. Moreover, the amount of droop observed for at least some negative values of output current may be varied by adjusting the value of $V_{ref}$. The offsetting of the amplifier input reference level by the reference voltage generator 232 provides a component-efficient way of protecting the SMPS 200 from inefficient operation and potential damage caused by current flow into the SMPS 200 from the output current rail 400 of the power supply system 2000.

The voltage droop control signal $V_A$ is related to the voltage reference $V_{ref}$ signal and signal $V_C$ by the following expression:

$$V_A = \frac{(R_4(R_1 + R_3))}{(R_1(R_2 + R_4))} V_{ref} + \left(1 - \frac{(R_4(R_1 + R_3))}{(R_1(R_2 + R_4))}\right) V_{out} - \frac{R_3}{R_1} V_c$$

If resistances in the voltage droop control circuit 230 are chosen such that:

$$\frac{(R_4(R_1 + R_3))}{(R_1(R_2 + R_4))} = 1,$$

the output voltage disappears from the above expression for $V_A$, yielding:

$$V_A = V_{ref} - \frac{R_3}{R_1} V_c,$$

where the resistances should have the relation $R_3/R_1 = R_2/R_4$.

Neglecting that $R_1$ is loading the filter, the voltage over the capacitor C may be written as:

$$V_c = R_L \frac{1 + sL/R_L}{1 + sCR_0} I_{out},$$

The filter may be designed as a low-pass filter with poor damping due to the zero caused by the inductor. An exact cancellation can be obtained if the resistance $R_0$ is added to the $R_4$ value given by the equations above.

The values for $R_0$ and C need to be selected carefully. If they are set to provide the filter with a high bandwidth, an unacceptable level of noise might be added to the signal $V_A$. On the other hand, if $R_0$ and C are set to provide a very low filter bandwidth, it will take a long time to adjust the output voltage, and the current sharing balance will be poor. In case of high noise levels, it may be desirable to provide additional filtering at the amplifier 231.

In order to reduce the effect of bias currents in the amplifier 231, it is preferable to use identical resistor values, i.e. setting $R_1 = R_2 = R_3 = R_4$, which yields an amplifier with a unity gain. A gain of 1 may be sufficient in many applications, since the output voltage $V_{out}$ signal is damped by the voltage divider comprising $R_{11}$ and $R_{12}$, in order to be compared with the reference voltage of $V_{ref}$ (which is set at 1.25 V in the present embodiment). For example, a voltage drop across capacitor C of $V_c=50$ mV may, in a 12.5V product, generate a voltage droop of approximately 500 mV. A gain G other than 1 may alternatively be used, as long as $V_{ref} G < V_{out}$. The voltage divider $R_{11}/R_{12}$ would then need to be adjusted accordingly to obtain the correct nominal output voltage.

Experimental Results

Figure 6:
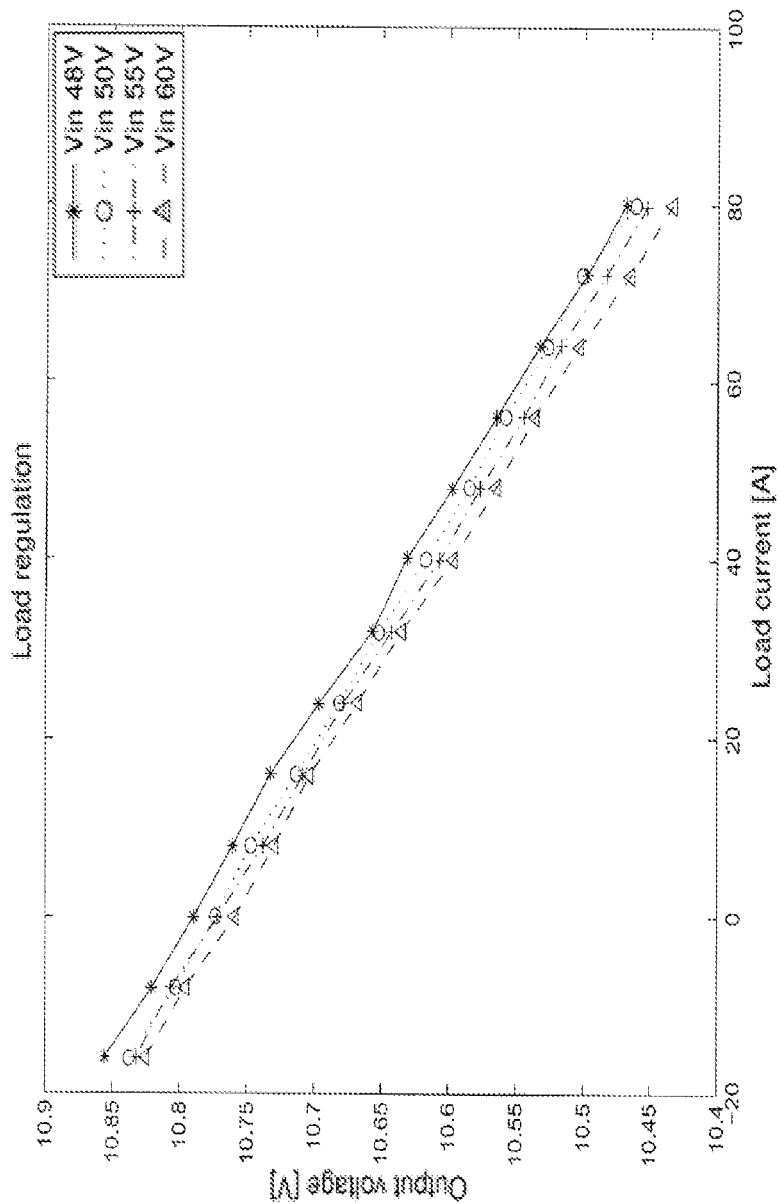
FIG. 6 is a plot of the output voltage $V_{out}$ as a function of the load current $I_{out}$ in an SMPS according to an embodiment, measured for different values of input voltage $V_{in}$.

FIG. 6 illustrates the artificial droop displayed by an SMPS according to the embodiment of FIG. 5. In particular, FIG. 6 is a plot of the measured output voltage $V_{out}$ as a function of the measured load current $I_{out}$, for input voltages $V_{in}$ of 48 V, 50 V, 55 V and 60V. The idling voltage, i.e. the output voltage at 0 A, shows that the SMPS exhibits a degree of line regulation, such that the output voltage changes little with variations in the input voltage. The measurements show that an approximately linear droop of approximately 400 mV is obtained in this example.

As shown in FIG. 6, the output voltage continues to increase essentially linearly with decreasing output current even when the output current crosses zero and then continues to decrease, becoming more negative. This behaviour in not observed in switched mode power supplies having conventional artificial droop.

Figure 7:
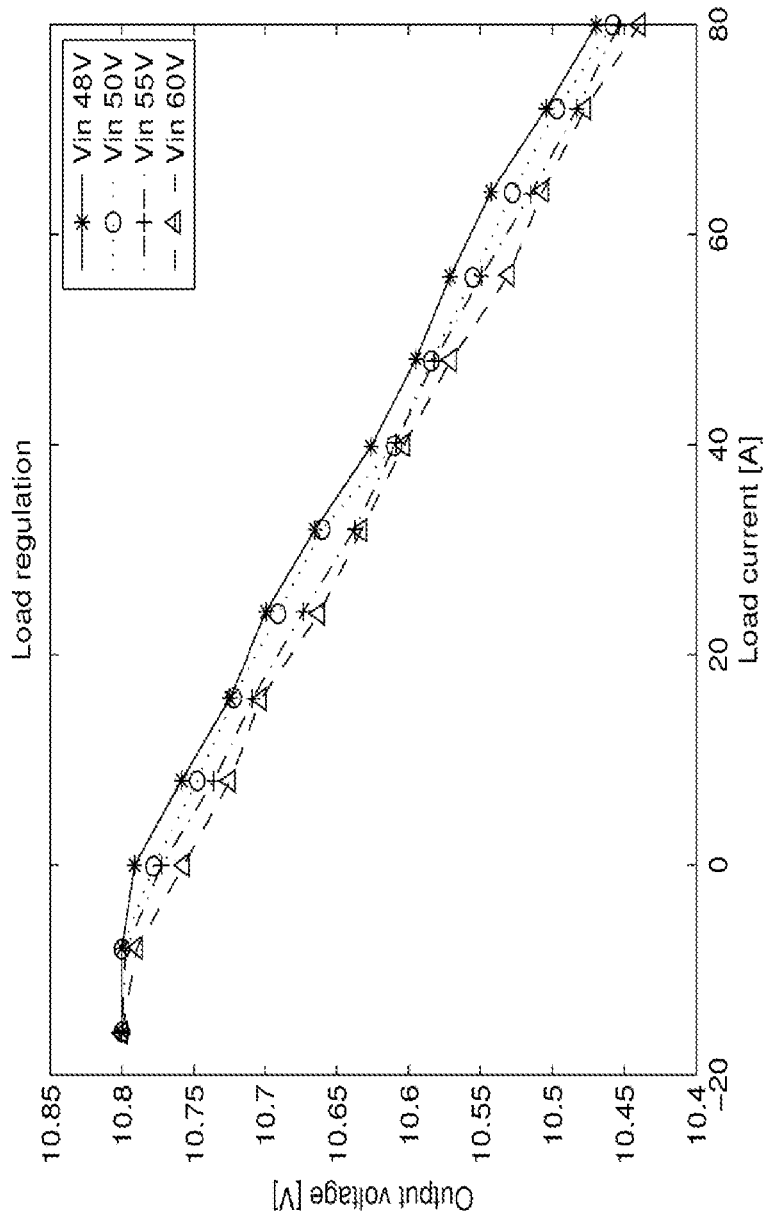
FIG. 7 is a plot of the output voltage $V_{out}$ as a function of the load current $I_{out}$ in the conventional SMPS of FIG. 1, measured for different values of input voltage $V_{in}$.

For example, FIG. 7 illustrates the artificial droop displayed by a conventional output-regulated SMPS having a droop control circuitry as illustrated in FIGS. 2 and 3. Similar to FIG. 6, FIG. 7 shows the measured output voltage $V_{out}$ as a function of the measured load current $I_{out}$, for input voltages $V_{in}$ of 48 V, 50 V, 55 V and 60 V. However, in contrast to FIG. 6, the output voltage is observed in FIG. 7 to tend towards saturation (in this example, at a maximum value of 10.8 V) as the current flowing into the SMPS increases. Thus, as shown in FIG. 7, the output voltage cannot increase to a value greater than the desired output voltage of the SMPS (in this example, 10.8 V), no matter how high the current flowing into the SMSP via its output terminal(s).

In summary, application of the reference voltage $V_{ref}$ to an input of the op-amp 231 has the effect of increasing the saturation (maximum) value of output voltage and delaying the onset of saturation until a higher negative output current level is reached, as well as increasing the amount of voltage droop observed for $I_{out}<0$ (the amount of increase being greater at higher negative current values). Depending on the value of $V_{ref}$, the expected onset of the saturation may, however, occur at such high negative values of $I_{out}$ that it cannot be observed in practice, owing to the limited range of currents that the SMPS is capable of sinking from the output rail 400 before breakdown.

Modifications and Variations

Many modifications and variations can be made to the embodiments described above.

For example, although the power supply system 2000 of the above embodiment employs SMPSs 200-1 to 200-N in the form of DC/DC converters, it will be appreciated that the droop control techniques described herein are not limited to SMPSs of this kind and a power supply having such SMPSs. For example, in another embodiment, the SMPS 200 for use in the power supply system 2000 may be provided in the form of an AC/DC converter, for example. Moreover, the power supply system 2000 may comprise one or more such AC/DC converters and one or more such DC/DC converters.

Furthermore, although each of the SMPSs 200-1 to 200-N in the power supply system 2000 constitutes an embodiment of the present invention, not all of the SMPSs in the power supply system 2000 need take this form. In this case, the power supply system would still have greater reliability that a conventional power supply system having SMPSs as described above with reference to FIGS. 2 and 3, for example. However, the power supply system 2000 of the above embodiment, in which all of the SMPSs 200-1 to 200-N exhibit output voltage droop for both positive and negative output currents, has the advantage of more effectively preventing the circulation of current from one SMPS in the system to another.

It is also noted that the component across which a voltage may be detected by the voltage droop control circuit 230 in order to obtain an indication of the SMPS output current is not limited to a resistor or an output choke connected to the output of the SMPS, and the voltage droop control circuit 230 may detect the voltage drop across another component of the SMPS 200. For example, in an alternative embodiment where the SMPS is of a fly-back topology, the voltage droop control circuit 230 may be connected to a secondary-side winding of the fly-back transformer in order to obtain an indication of the output current level when the SMPS is operating in continuous conduction mode (CCM).

Although the controller 220 in the above embodiment includes a PID regulator 121, it will be appreciated that the regulator may alternatively be configured to regulate the switching duty cycle of the SMPS 200 based on one or more, but not all, of the proportional (P), integral (I) and derivative (D) control parameters.

Furthermore, in the above embodiment, the controller 220 is provided in the form of a PWM controller. However, the controller 220 may alternatively take the form of a frequency modulator, which controls the output voltage of the SMPS by varying the frequency used in the switch network 210.

Figure 8:
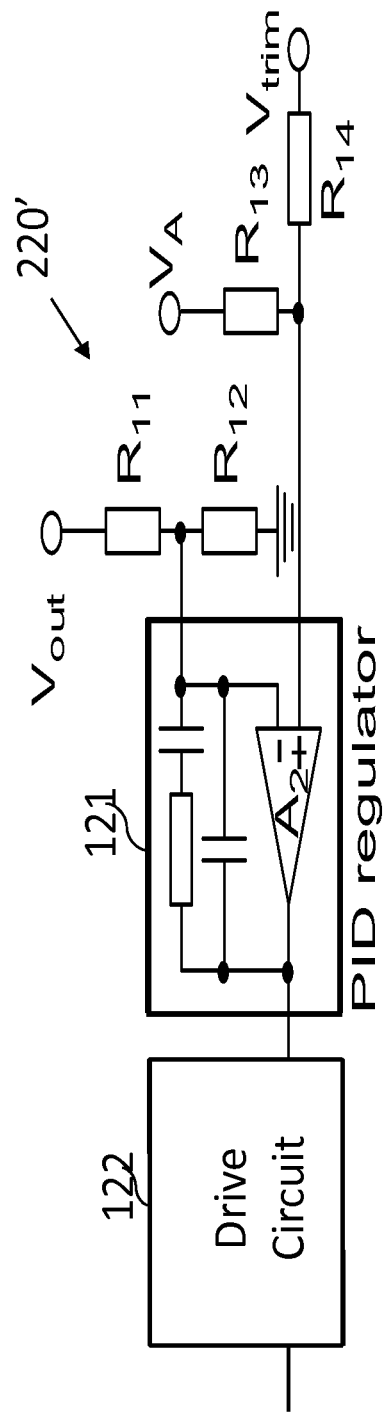
FIG. 8 shows an alternative configuration of the controller that may be used in the embodiment of FIG. 5.

As shown in FIG. 8, in an alternative embodiment, the controller 220' may be configured with a Lucent trim by the addition of only two resistors, $R_{13}$ and $R_{14}$. The trim terminal may alternatively be provided between the voltage reference 232 and resistor $R_4$ in the example of FIG. 5, although this would require an extra buffer to be provided.

The invention claimed is:

1. A switched mode power supply comprising:
a controller configured to control switching of the switched mode power supply to regulate an output voltage at an output of the switched mode power supply based on a feedback signal that is indicative of the output voltage; and
a voltage droop control circuit comprising:
a voltage droop control signal generator having a first input and a second input coupled so as to detect a voltage drop across a component of the switched mode power supply that is indicative of a current flow through the output of the switched mode power supply during operation, and in which the second input is coupled to the output,
wherein the voltage droop control signal generator is an active device that is arranged to generate, based on the detected voltage drop, an output voltage droop control signal that causes the controller, along with the feedback signal, to adjust the regulation of the output voltage; and
a reference voltage generator arranged to provide a voltage reference to bias the second input of the voltage droop control signal generator to adjust the regulation of the output voltage when the current flow is out of the output and also to adjust the regulation of the output voltage when the current flow is into the output.

2. The switched mode power supply according to claim 1, wherein the voltage droop control signal generator is arranged to detect, via the first and second inputs, a voltage difference across a capacitor that is indicative of at least a portion of a voltage drop across an inductor that is connected serially to the current flow at the output of the switched mode power supply, and to generate the output voltage droop control signal based on the detected voltage difference, such that the output voltage droop control signal is indicative of the current flow through the inductor.

3. The switched mode power supply according to claim 1, wherein the voltage droop control signal generator is arranged to generate the output voltage droop control signal whose amplitude is limited by a voltage of a voltage source used to power the voltage droop control signal generator.

4. The switched mode power supply according to claim 3, wherein the voltage droop control signal generator is an operational amplifier.

5. The switched mode power supply according to claim 1, wherein the reference voltage generator is arranged to bias the second input of the voltage droop control signal generator via a buffer.

6. The switched mode power supply according to claim 1, wherein the controller comprises an operational amplifier arranged to receive the feedback signal and the output voltage droop control signal at different inputs of the operational amplifier and to control switching of the switched mode power supply based on the received signals.

7. A power supply system comprising a plurality of switched mode power supplies that are coupled in parallel to supply power to a load, wherein at least one of the plurality of switched mode power supplies comprises a particular type of switched mode power supply that comprises:
a controller configured to control switching of the particular type of switched mode power supply to regulate an output voltage at an output of the particular type of switched mode power supply based on a feedback signal that is indicative of the output voltage; and
a voltage droop control circuit comprising:
a voltage droop control signal generator having a first input and a second input coupled so as to detect a voltage drop across a component of the particular type of switched mode power supply that is indicative of a current flow through the output of the particular type of switched mode power supply during operation, and in which the second input is coupled to the output,
wherein the voltage droop control signal generator is an active device that is arranged to generate, based on the detected voltage drop, an output voltage droop control signal that causes the controller, along with the feedback signal, to adjust the regulation of the output voltage; and
a reference voltage generator arranged to provide a voltage reference to bias the second input of the voltage droop control signal generator to adjust the regulation of the output voltage when the current flow is out of the output and also to adjust the regulation of the output voltage when the current flow is into the output.

8. The power supply system according to claim 7, wherein each of the plurality of switched mode power supplies comprises the particular type of switched mode power supply.

9. The switched mode power supply according to claim 7, wherein the voltage droop control signal generator is arranged to detect, via the first and second inputs, a voltage difference across a capacitor that is indicative of at least a portion of a voltage drop across an inductor that is connected serially to the current flow at the output of the switched mode power supply, and to generate the output voltage droop control signal based on the detected voltage difference, such that the output voltage droop control signal is indicative of the current flow through the inductor.

10. The switched mode power supply according to claim 7, wherein the voltage droop control signal generator is arranged to generate the output voltage droop control signal whose amplitude is limited by a voltage of a voltage source used to power the voltage droop control signal generator.

11. The switched mode power supply according to claim 10, wherein the voltage droop control signal generator is an operational amplifier.

12. The switched mode power supply according to claim 7, wherein the reference voltage generator is arranged to bias the second input of the voltage droop control signal generator via a buffer.

13. The switched mode power supply according to claim 7, wherein the controller comprises an operational amplifier arranged to receive the feedback signal and the output voltage droop control signal at different inputs of the operational amplifier and to control switching of the switched mode power supply based on the received signals.

\* \* \* \* \*